US009677622B2

(12) United States Patent
Mordukhovich et al.

(10) Patent No.: US 9,677,622 B2
(45) Date of Patent: Jun. 13, 2017

(54) CLUTCH WITH OPPOSITE LOAD APPLICATION

(71) Applicant: AVL Powertrain Engineering, Inc., Plymouth, MI (US)

(72) Inventors: Gregory Mordukhovich, Bloomfield Hills, MI (US); Michael Kozan, Canton, MI (US)

(73) Assignee: AVL POWERTRAIN ENGINEERING, INC., Plymouth, MI (US)

(*) Notice: Subject to any disclaimer, the term of this patent is extended or adjusted under 35 U.S.C. 154(b) by 0 days.

(21) Appl. No.: 15/051,085

(22) Filed: Feb. 23, 2016

(65) Prior Publication Data

US 2016/0252141 A1   Sep. 1, 2016

Related U.S. Application Data

(60) Provisional application No. 62/121,840, filed on Feb. 27, 2015, provisional application No. 62/121,864, filed on Feb. 27, 2015.

(51) Int. Cl.
*B60W 10/18* (2012.01)
*F16D 13/52* (2006.01)
*F16D 13/46* (2006.01)

(52) U.S. Cl.
CPC ............ *F16D 13/52* (2013.01); *F16D 13/46* (2013.01)

(58) Field of Classification Search
CPC ................................ F16D 13/52; F16D 13/46
See application file for complete search history.

(56) References Cited

U.S. PATENT DOCUMENTS

| 3,384,214 A | 5/1968 | Wilson |
| 4,144,955 A | 3/1979 | Garnier |

(Continued)

FOREIGN PATENT DOCUMENTS

| DE | 102013224591 A1 | 6/2014 |
| JP | S61180028 A | 8/1986 |
| JP | 07042757 | 2/1995 |

OTHER PUBLICATIONS

Extended European Search Report for Application No. 16157516.2 dated Jul. 29, 2016.

(Continued)

*Primary Examiner* — David J Hlavka
(74) *Attorney, Agent, or Firm* — Harness, Dickey & Pierce, P.L.C.

(57) ABSTRACT

A clutch assembly that is less prone to overheating is disclosed. The clutch assembly includes a clutch housing, a shaft, and a clutch pack. The clutch pack includes a first apply plate, a second apply plate, a plurality of friction plates, and a plurality of reaction plates. The clutch assembly further includes a first actuator and a second actuator. The first actuator applies pressure to the first apply plate in a first direction to move the first apply plate toward the second apply plate. The second actuator applies pressure to the second apply plate in a second direction to move the second apply plate toward the first apply plate. The first direction is opposite the second direction such that the first and second actuators apply pressure to the clutch pack in opposing directions. This reduces localized temperature spikes in the clutch pack.

36 Claims, 9 Drawing Sheets

(56) References Cited

U.S. PATENT DOCUMENTS

| | | | |
|---|---|---|---|
| 4,372,434 A | 2/1983 | Aschauer | |
| 4,396,101 A | 8/1983 | Black | |
| 5,901,826 A | 5/1999 | Datta | |
| 6,095,946 A | 8/2000 | Maguire et al. | |
| 8,409,053 B2 | 4/2013 | Samie et al. | |
| 8,640,843 B2 | 2/2014 | Ogasawara et al. | |
| 2007/0080041 A1 | 4/2007 | Goto et al. | |
| 2011/0067969 A1 | 3/2011 | Reed et al. | |
| 2015/0275984 A1* | 10/2015 | Goetz | F16D 13/686 192/70.19 |
| 2015/0377303 A1* | 12/2015 | Adachi | F16D 13/54 192/70.27 |
| 2016/0084322 A1* | 3/2016 | Arhab | F16D 13/385 192/70.12 |
| 2016/0178015 A1* | 6/2016 | Mordukhovich | F16D 13/70 192/54.1 |
| 2016/0290413 A1* | 10/2016 | Finkenzeller | F16D 13/52 |

OTHER PUBLICATIONS

Jen, Tien-Chen et al., Thermal Analysis of a Wet-Disk Clutch Subjected to a Constant Energy Engagement, ScienceDirect, Mar. 2007.

Extended European Search Report for Application No. 16157514.7 dated May 6, 2016.

Chinese Office Action for Application No. 201521075637.3 dated Apr. 5, 2016.

U.S. Appl. No. 14/956,861, filed Dec. 2, 2015, Gregory Mordukhovich, et al.

U.S. Appl. No. 15/051,010, filed Feb. 23, 2016, Gregory Mordukhovich.

\* cited by examiner

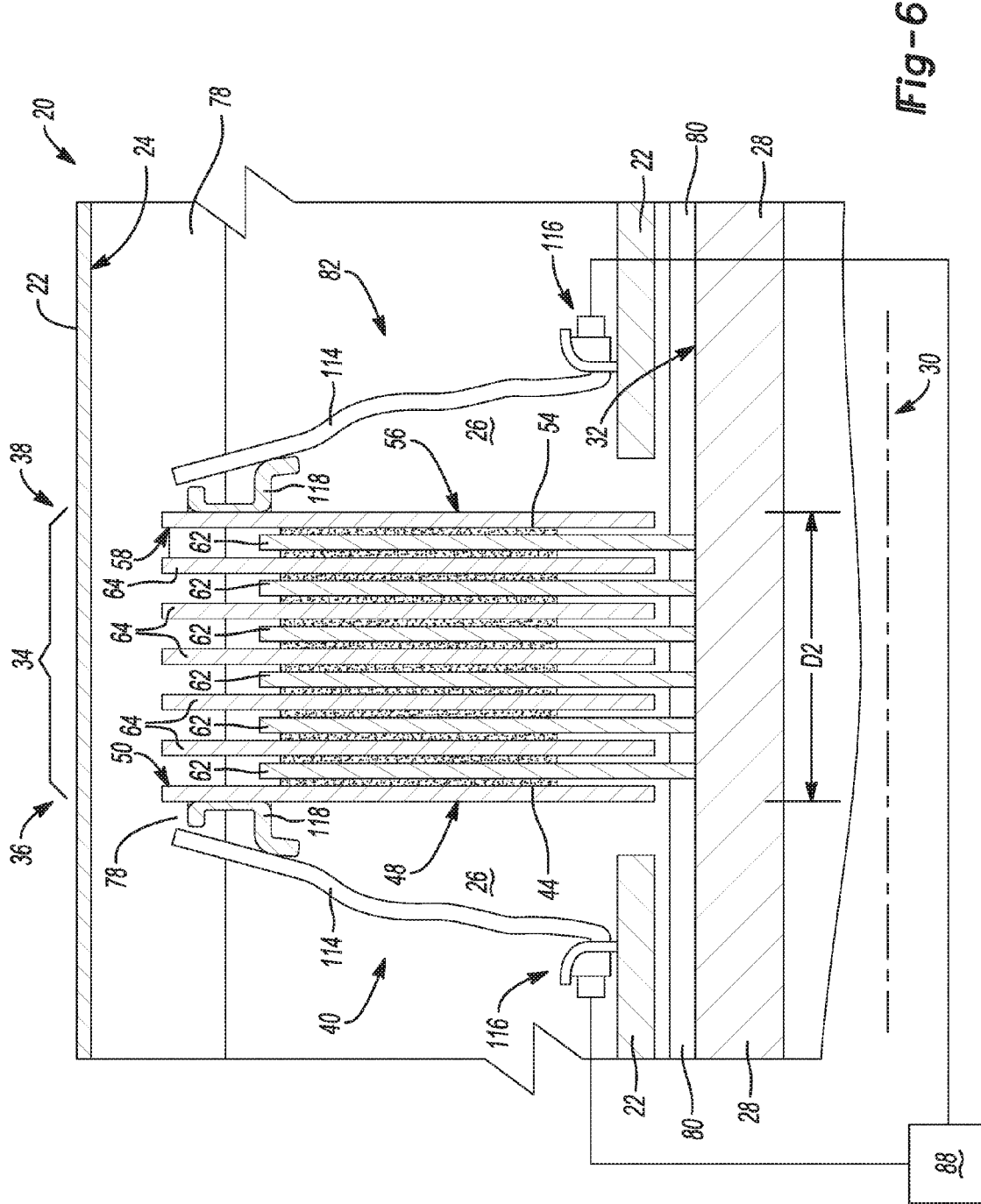

CLUTCH WITH OPPOSITE LOAD APPLICATION

CROSS-REFERENCE TO RELATED APPLICATIONS

This application claims the benefit of U.S. Provisional Application No. 62/121,864, filed on Feb. 27, 2015, and U.S. Provisional Application No. 62/121,840, filed on Feb. 27, 2015. Additionally, this application is related to U.S. Utility application Ser. No. 14/956,861, filed on Dec. 2, 2015, and U.S. Utility patent application Ser. No. 15/051,010, entitled "Clutch With Decremental Torque Function"), filed concurrently herewith. The entire disclosures of the applications referenced above are incorporated herein by reference.

FIELD

The present disclosure generally relates to vehicle transmissions, and more specifically, to clutch assemblies having a plurality of friction plates and a plurality of reaction plates that are disposed in an interleaving relationship.

BACKGROUND

This section provides background information related to the present disclosure which is not necessarily prior art.

Clutch assemblies are commonly used in vehicle transmissions to shift into a forward gear, to shift between forward gears, or to shift into a reverse gear. As a shift is being effectuated by the transmission, clutch assemblies selectively supply torque from a prime mover, such as an engine, to one or more gears of the transmission. Because clutch assemblies can decouple the prime mover from the one or more gears of the transmission, shifts can be accomplished without stalling the engine and/or binding the transmission.

Such clutch assemblies may generally include a clutch housing and a shaft that is disposed within the clutch housing. A clutch pack may be disposed radially between the clutch housing and the shaft. The clutch pack selectively couples rotation of the clutch housing and the shaft. The clutch pack may include various combinations of friction plates and reaction plates that transfer torque between the clutch housing and the shaft when the friction plates and reaction plates are pressed together in an engagement direction by a clutch actuator. While the friction plates and the reaction plates are rotatably coupled to the clutch housing and the shaft, they are moveable in the engagement direction with respect to the clutch housing and the shaft. A backing plate may be provided at one end of the clutch pack that is retained on either the clutch housing or the shaft. Longitudinal movement of the backing plate relative to the clutch housing and the shaft may be limited such that the backing plate acts as a stop for the friction plates and reaction plates when the friction plates and reaction plates are pushed in the engagement direction towards the backing plate by the clutch actuator. A single apply plate is provided at an opposite end of the clutch pack. Like the friction plates and reaction plates, the single apply plate is moveable in the engagement direction with respect to the clutch housing and the shaft.

The clutch actuator may be configured to apply pressure to the single apply plate in the engagement direction. This unidirectional pressure causes the single apply plate to slide towards the backing plate in the engagement direction. As a result, the friction plates and the reaction plates of the clutch pack are squeezed between the single apply plate and the backing plate. In other words, actuation of the clutch actuator longitudinally compresses the clutch pack in the engagement direction. Torque transfer between the friction plates and the reaction plates then occurs through friction interfaces that are disposed between adjacent friction plates and reaction plates. The clutch actuator may release the unidirectional pressure applied to the single apply plate to disengage the clutch pack. When the clutch actuator releases the unidirectional pressure applied to the single apply plate, the single apply plate moves longitudinally in a disengagement direction. The disengagement direction is generally opposite the engagement direction such that the single apply plate moves away from the backing plate in the disengagement direction, allowing the clutch pack to longitudinally expand.

The clutch engagement process begins when the clutch actuator applies pressure to the single apply plate. Where the clutch assembly is a wet clutch assembly, the clutch engagement process may generally be described in three stages: the hydrodynamic stage, the squash stage, and lock-up stage. The hydrodynamic stage is the first stage in the clutch engagement process. While the clutch actuator is moving the single apply plate longitudinally toward the backing plate in the hydrodynamic stage, there is little to no contact between the friction plates and the reaction plates of the clutch pack and the friction plates and reaction plates remain separated by a fluid film. Typically, no torque is transferred between friction plates and the reaction plates and thus the clutch shaft and the housing in the hydrodynamic stage. However, it should be appreciated that small, incidental amounts of torque transfer may occur in the hydrodynamic stage through fluid shear occurring within the fluid film disposed between adjacent friction plates and reaction plates. The squash stage is the second stage in the clutch engagement process. The clutch actuator is still moving the single apply plate longitudinally toward the backing plate in the squash stage, but now the friction plates have begun to contact the apply plates. In the squash stage, there is slippage (i.e. relative motion) between the friction plates and the apply plates despite the friction plates contacting the reaction plates at the friction interfaces. The kinetic energy of the relative motion between the friction plates and the reactions plates is absorbed during slippage and converted to friction generated heat. Although this heat is undesirable from a thermal management standpoint, this slippage is necessary to allow for the gradual transfer of torque between the shaft and the housing without stalling the prime mover, shocking the clutch assembly (which could lead to structural failures), and rapid, jerky acceleration. The majority of the torque transferred through the clutch assembly during the squash stage is done at the points of material contact at the friction interfaces between the friction plates and the reaction plates with tribo-chemical, mixed lubrication and/or elasto-hydrodynamic lubrication layers and not through fluid shear. The lock-up stage is the third stage in the clutch engagement process. In the lock-up stage, the clutch actuator is still applying pressure to the single apply plate in the engagement direction, but the single apply plate has stopped moving longitudinally toward the backing plate because the clutch pack is fully compressed between the single apply plate and the backing plate. In the lock-up stage, there is no slippage (i.e. relative motion) between the friction plates and the reaction plates such that the shaft rotates with the clutch housing and 100 percent of the torque at the shaft is transferred to the clutch housing. Accordingly, in the lock-up stage, there is no heat generation between the friction plates and the reaction plates and the friction interfaces begin to cool.

Temperature as it relates to the torque being transmitted through the clutch assembly is a primary design consideration when selecting the size, number, and material of the friction plates and the reaction plates. In dual-clutch transmissions in particular, temperature build-up in the friction interface(s) near the clutch actuator is a primary limiting factor. Temperature build-up in the clutch assembly limits toque capacity and is also a major consideration when designing clutch cooling components. In the case of wet clutches, where the friction plates and reaction plates are immersed in fluid, selection of the viscosity and formulation of the fluid, the fluid capacity of the clutch housing, and the pumping capacity of the clutch assembly are closely tied to the expected temperature build-up. Temperature build-up in the clutch assembly occurs when the clutch actuator begins to compresses the clutch pack, which produces friction generated heat as the friction plates and the reaction plates contact one another. The unidirectional pressure applied to the clutch pack in the engagement direction leads to variation in the time the friction plates are compressed in contact with the reaction plates. This results in temperature variations among the friction interfaces, with the highest temperatures occurring at the friction interfaces that have been in contact the longest (i.e. the friction interfaces closest to the clutch actuator). The temperature build-up in clutch assemblies has been studied in detail. Authors Ten et al. published one such study, entitled "Thermal analysis of a wet-disk clutch subjected to a constant energy engagement," in the International Journal of Heat and Mass Transfer, Volume 51, Issues 7-8, April 2008, Pages 1757-1769. This study confirms that the highest temperatures in clutch assemblies typically occur at the friction interfaces nearest the clutch actuator. Accordingly, the friction interfaces nearest the clutch actuator act as a design constraint and the overall clutch assembly must be designed to avoid overheating of these friction interfaces.

In many clutch assemblies, peak temperatures occur at the friction interface that is the second closest to the clutch actuator. This is attributed to the fact that the single apply plate, clutch actuator, and clutch housing can act as a heat sink, cooling the friction interface that is closest to the clutch actuator. As a result, the friction interface that is second closest to the clutch actuator is often the one that overheats and is therefore a primary limiting factor in the design of clutch assemblies. To reduce the likelihood of overheating the friction interfaces nearest the clutch actuator, oversized friction plates may be used that have greater thickness and/or larger diameters. The increased mass and/or surface area of the oversized friction plates improves heat dissipation away from the friction interfaces and also makes the friction plates less prone to heat related failures. However, the size increase of the friction plates negatively impacts the efficiency, packaging, and price of the clutch assembly. Another way overheating is addressed is by increasing the fluid capacity of the clutch housing and/or pumping capacity of the clutch assembly. While increasing these parameters provides better cooling to the friction interfaces, greater fluid capacity and pumping capacity negatively impacts efficiency, packaging, and price of the clutch assembly.

Another approach for reducing the likelihood of overheating the friction interfaces nearest the clutch actuator is to control clutch actuation and/or the prime mover such that reduced torque is transmitted through the clutch assembly. In some instances, actuation of the clutch assembly may be controlled so as to provide for early clutch engagement before the amount of torque transmitted through the clutch assembly is high (i.e. early lock-up). In other instances, the torque transmitted through the clutch during vehicle launch may be reduced by launching the vehicle in second gear instead of in first gear. As disclosed in U.S. Pat. No. 6,095,946 to Maguire et al., another control method is to limit the output of the engine during clutch engagement so that repeated shifts will not overheat the friction interface. For example, fuel to the engine may be limited or the spark timing may be retarded to reduce the amount of torque that the engine supplies to the clutch assembly. A major drawback to these approaches however is that driving quality is negatively impacted. Acceleration and power may be compromised under these approaches and shift quality is reduced. Noise, vibration, and harshness (NVH) is often increased under such control schemes, which negatively affects customer driving experience. What is needed is a solution that reduces the likelihood of overheating the friction interfaces without the associated efficiency, packaging, cost, and drive quality drawbacks noted above.

SUMMARY

This section provides a general summary of the disclosure, and is not a comprehensive disclosure of its full scope or all of its features.

In accordance with one aspect of the subject disclosure, a clutch assembly that is less prone to overheating is provided. The clutch assembly generally includes a clutch housing, a shaft, and a clutch pack. The clutch housing has an internal surface that defines an inner cavity within the clutch housing. The shaft is disposed within the inner cavity of the clutch housing. The shaft extends along a longitudinal axis and has an outer surface. The clutch pack is disposed radially between the clutch housing and the shaft. The clutch pack selectively couples rotation of the clutch housing and the shaft and includes a first end and a second end. The second end of the clutch pack is opposite the first end of the clutch pack such that the second end of the clutch pack is longitudinally spaced from the first end of the clutch pack.

The clutch pack is moveable between an uncompressed state and a compressed state. When the clutch pack is in the uncompressed state, the clutch housing and the shaft are free to rotate relative to one another. When the clutch pack is in the compressed state, the clutch housing and the shaft are rotatably coupled such that the clutch housing and the shaft rotate together. The clutch pack includes a first apply plate, a second apply plate, a plurality of friction plates, and a plurality of reaction plates. The first apply plate is disposed at the first end of the clutch pack and is moveable along the longitudinal axis relative to the clutch housing and the shaft. The second apply plate is disposed at the second end of the clutch pack and is moveable along the longitudinal axis relative to the clutch housing and the shaft. The plurality of friction plates are disposed between the first apply plate and the second apply plate and each friction plate in the plurality of friction plates is moveable along the longitudinal axis relative to the clutch housing and the shaft. The plurality of reaction plates are also disposed between the first apply plate and the second apply plate. The plurality of reaction plates are arranged in an interleaving relationship with the plurality of friction plates and each reaction plate in the plurality of reaction plates is moveable along the longitudinal axis relative to the clutch housing and the shaft.

The clutch assembly further includes a first actuator and a second actuator. The first actuator selectively applies pressure to the first end of the clutch pack in a first direction to move the first end of the clutch pack toward the second end of the clutch pack. The second actuator selectively applies pressure to the second end of the clutch pack in a second direction to move the second end of the clutch pack toward the first end of the clutch pack. The first direction is opposite the second direction such that the first and second actuators apply pressure to the clutch pack in opposing directions. Advantageously, this reduces localized temperature spikes in the clutch pack by more uniformly spreading out the torque and thus the friction generated heat across the clutch pack in comparison to unidirectional actuation of the clutch pack (i.e. applying pressure to the clutch pack from only one end). Accordingly, the disclosed clutch assembly is less prone to overheating. At the same time, the size of the clutch pack and the cooling capacity of the clutch assembly can remain the same. Additionally, because the unique structure and actuation of the disclosed clutch assembly reduce localized temperature hot spots at the first end of the clutch pack, the need for second gear launches, early clutch engagement, or a reduction in the output of the engine is obviated. Therefore, the disclosed clutch assembly does not suffer from the same efficiency, packaging, cost, and drive quality drawbacks associated with other solutions to friction interface overheating.

In accordance with another aspect of the subject disclosure, a method of engaging the clutch assembly described herein is also provided. Again, the clutch assembly generally includes the shaft, the clutch housing, and the clutch pack. The clutch pack includes the first apply plate and the second apply plate. The plurality of friction plates and the plurality of reaction plates are disposed between the first apply plate and the second apply plate in an interleaving relationship. The method generally includes the steps of: applying torque to the shaft, preventing the first apply plate from traveling longitudinally beyond a first longitudinal limit measured relative to the shaft and the clutch housing, and preventing the second apply plate from traveling longitudinally beyond a second longitudinal limit measured relative to the shaft and the clutch housing. The method also includes the step of switching the clutch pack to the compressed state at a first time by applying pressure to the first apply plate to move the first apply plate longitudinally toward the second apply plate in order to compress the plurality of reaction plates and the plurality of friction plates between the first apply plate and the second apply plate at the first time to transfer torque from the shaft to the clutch housing via the clutch pack.

The method further includes the steps of: switching the clutch pack to the uncompressed state at a second time by relieving the pressure on the first apply plate to move the first apply plate longitudinally away from the second apply plate allowing the clutch pack to expand longitudinally and switching the clutch pack back to the compressed state at a third time by applying pressure to the second apply plate to move the second apply plate longitudinally toward the first apply plate in order to compress the plurality of reaction plates and the plurality of friction plates between the first apply plate and the second apply plate at the third time to transfer torque from the shaft to the clutch housing via the clutch pack. In accordance with one aspect of the method, the second time may be subsequent to the first time and the third time may be subsequent to the second time. By applying pressure to the friction plates and the reaction plates of the clutch pack in opposing directions from both the first end and the second end of the clutch pack, the disclosed method distributes torque and therefore friction generated heat more evenly across the clutch pack to reduce the likelihood of overheating.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a partial, cross-sectional view of the clutch assembly of FIG. 5 where the clutch assembly is shown in a compressed state;

DETAILED DESCRIPTION

Figure 1:
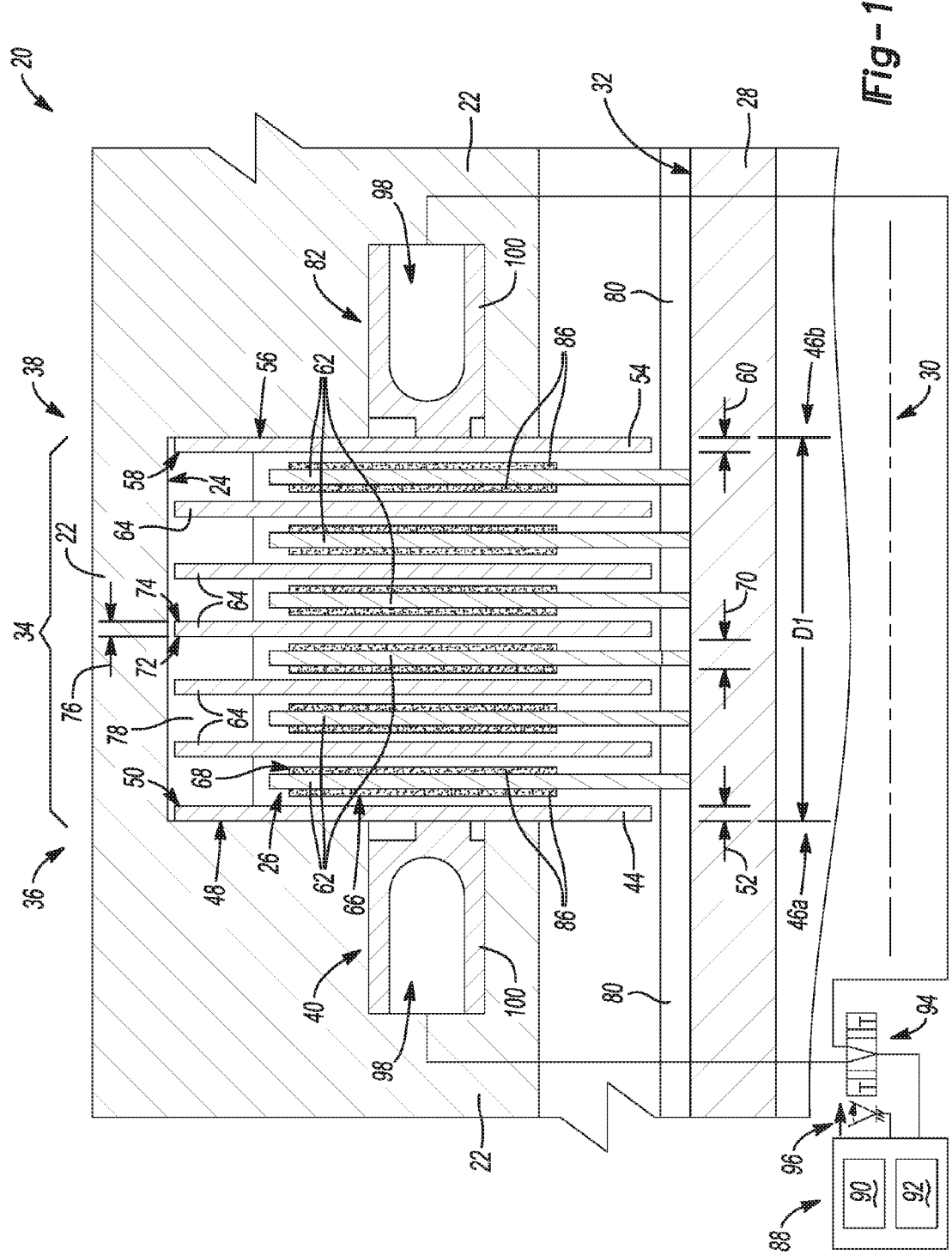
FIG. 1 is a partial, cross-sectional view of an exemplary clutch assembly constructed in accordance with the subject disclosure where the clutch assembly is shown in an uncompressed state.

Referring to the Figures, wherein like numerals indicate corresponding parts throughout the several views, several clutch assemblies 20 with improved overheat resistance are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally, clutch assemblies, such as the clutch assemblies 20 disclosed in the Figures, may be used in a transmission of a vehicle to shift into a forward gear, to shift between forward gears, or to shift into a reverse gear. The transmission may generally have a transmission case that houses the forward and/or reverse gears. The disclosed clutch assemblies 20 may be disposed within the transmission case, connected in series with the transmission case, or integral with the transmission case.

Figure 2:
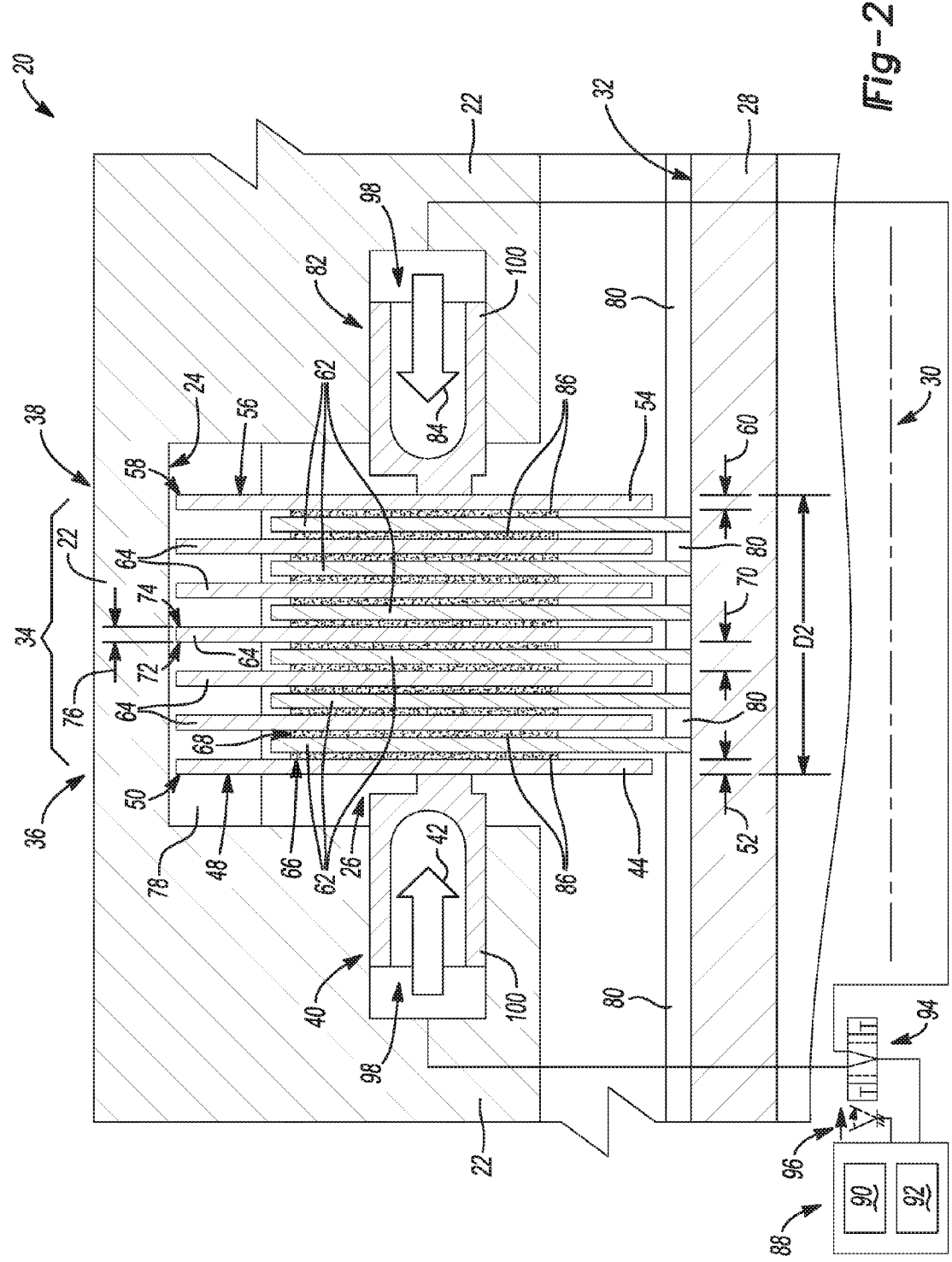
FIG. 2 is a partial, cross-sectional view of the clutch assembly of FIG. 1 where the clutch assembly is shown in a compressed state.

As illustrated in FIGS. 1 and 2, the clutch assembly 20 generally includes a clutch housing 22 having an internal surface 24 that defines an inner cavity 26. The inner cavity 26 is thus disposed within the clutch housing 22 and may have a variety of different shapes. By way of example and without limitation, the inner cavity 26 of the clutch housing 22 may have a cylindrical shape. A shaft 28 is disposed co-axially within the inner cavity 26 of the clutch housing 22. The shaft 28 extends along and operably rotates about a longitudinal axis 30. As such, it should be appreciated that the terms "longitudinally" and "longitudinal direction," as used herein, refer to movement in a direction that is substantially parallel with the longitudinal axis 30. The shaft 28 presents an outer surface 32 that may also be cylindrical in shape. A clutch pack 34 is disposed radially between the clutch housing 22 and the shaft 28. The clutch pack 34 selectively couples rotation of the clutch housing 22 and the shaft 28, as will be explained in greater detail below. The clutch pack 34 generally has a first end 36 and a second end 38 opposite the first end 36 that is longitudinally spaced from the first end 36. The clutch pack 34 is moveable between an uncompressed state (as shown in FIG. 1) and a compressed state (as shown in FIG. 2). In the uncompressed state, the first end 36 and the second end 38 of the clutch pack 34 are longitudinally spaced apart by a first distance D1. In the compressed state, the first end 36 and the second end 38 of the clutch pack 34 are longitudinally spaced apart by a second distance D2, which is less than the first distance D1. As will be further explained below, the clutch housing 22 and the shaft 28 are free to rotate relative to one another when the clutch pack 34 is in the uncompressed state whereas the clutch housing 22 and the shaft 28 rotate together when the clutch pack 34 is in the compressed state.

A first actuator 40 is disposed adjacent the first end 36 of the clutch pack 34. The first actuator 40 is moveable between an extended position (shown in FIG. 2) and a retracted position (shown in FIG. 1). The first actuator 40 is operable to selectively apply pressure (i.e. force) to the clutch pack 34 in a first direction 42 by transitioning from the retracted position to the extended position. The first direction 42 is substantially parallel with the longitudinal axis 30 and generally points in the direction of the second end 38 of the clutch pack 34 (i.e. to the right in FIG. 2). In response to the pressure applied by the first actuator 40, the first end 36 of the clutch pack 34 moves longitudinally toward the second end 38 of the clutch pack 34. In other words, the pressure applied by primary actuator 40 acts in the first direction 42 and forces the first end 36 of the clutch pack 34 longitudinally toward the second end 38 of the clutch pack 34 in the first direction 42.

The clutch pack 34 includes a first apply plate 44 disposed at the first end 36 of the clutch pack 34. In the example shown in FIGS. 1 and 2, the first apply plate 44 is rotatably coupled to the clutch housing 22 such that the first apply plate 44 rotates with the clutch housing 22. The first apply plate 44 is retained on the clutch housing 22 such that the first apply plate 44 cannot move longitudinally relative to the clutch housing 22 beyond a first longitudinal limit 46a. In the example shown in FIGS. 1 and 2, the first longitudinal limit 46a is defined by the first actuator 40 when the first actuator 40 is disposed in the retracted position. In other words, the first apply plate 44 is limited from moving to the left in FIG. 1 beyond the first longitudinal limit 46a by the first actuator 40 since the first actuator 40 acts as a stop for the first apply plate 44 when the first actuator 40 is in the retracted position. Although the first apply plate 44 may have a variety of different shapes, the first apply plate 44 may have an annular shape. The first apply plate 44 may also include a first exterior side 48 and a first interior side 50 that is longitudinally spaced from the first exterior side 48 by a first thickness 52.

The clutch pack 34 also includes a second apply plate 54 disposed at the second end 38 of the clutch pack 34. In the example shown in FIGS. 1 and 2, the second apply plate 54 is rotatably coupled to the clutch housing 22 such that the second apply plate 54 rotates with the clutch housing 22. The second apply plate 54 is retained on the clutch housing 22 such that the second apply plate 54 cannot move longitudinally relative to the clutch housing 22 beyond a second longitudinal limit 46b. Although the second apply plate 54 may have a variety of different shapes, the second apply plate 54 may have an annular shape. Additionally, the second apply plate 54 may include a second exterior side 56 and a second interior side 58 that is longitudinally spaced from the second exterior side 56 by a second thickness 60. While other configurations are possible, the second thickness 60 of the second apply plate 54 may be equal to the first thickness 52 of the first apply plate 44. In other words, the first apply plate 44 and the second apply plate 54 may have equal thicknesses.

The clutch pack 34 additionally includes a plurality of friction plates 62 and a plurality of reaction plates 64 that are disposed adjacent to one another in an interleaving relationship between the first apply plate 44 and the second apply plate 54. As such, the first apply plate 44, the second apply plate 54, the plurality of friction plates 62, and the plurality of reaction plates 64 collectively make up the clutch pack 34. The term "interleaving relationship" used herein means that the sequence of friction plates 62 and reaction plates 64 in the clutch pack 34 alternates, where a friction plate 62 is positioned next to a reaction plates 64, which is next to another friction plate 62. The plurality of friction plates 62 are rotatably coupled to the shaft 28 such that the plurality of friction plates 62 rotate with the shaft 28. Although the plurality of friction plates 62 may have a variety of different shapes, each friction plate 62 in the plurality of friction plates 62 may have an annular shape. Each friction plate 62 of the plurality of friction plates 62 may also include a first side 66 and a second side 68 that is longitudinally spaced from the first side 66 by a third thickness 70. While other configurations are possible, the third thickness 70 of each friction plate 62 of the plurality of friction plates 62 may be less than or equal to the first thickness 52 of the first apply plate 44 and the second thickness 60 of the second apply plate 54. In other words, the first apply plate 44 and the second apply plate 54 may each have a thicker construction than that of each friction plate 62 of the plurality of friction plates 62 or the first apply plate 44, the second apply plate 54, and each of the plurality of friction plates 62 may have equal thicknesses.

As shown in FIGS. 1 and 2, the plurality of reaction plates 64 are rotatably coupled to the clutch housing 22 such that the plurality of reaction plates 64 rotate with the clutch housing 22. Although the plurality of reaction plates 64 may have a variety of different shapes, each reaction plate 64 in the plurality of reaction plates 64 may have an annular shape. Each reaction plate 64 of the plurality of reaction plates 64 may also include a first face 72 and a second face 74 that is longitudinally spaced from the first face 72 by a fourth thickness 76. While other configurations are possible, the fourth thickness 76 of each reaction plate 64 of the plurality of reaction plates 64 may be less than or equal to the first thickness 52 of the first apply plate 44 and the second thickness 60 of the second apply plate 54. In other words, the first apply plate 44 and the second apply plate 54 may each have a thicker construction than that of each reaction plate 64 of the plurality of reaction plates 64 or the first apply plate 44, the second apply plate 54, and each of the plurality of reaction plates 64 may have equal thicknesses. In some configurations, the fourth thickness 76 of each reaction plate 64 of the plurality of reaction plates 64 may equal the third thickness 70 of each friction plate 62 of the plurality of friction plates 62. In other words, the friction plates 62 and the reaction plates 64 may have equal thicknesses.

As noted above, the first apply plate 44, the second apply plate 54, and the plurality of reaction plates 64 in FIGS. 1 and 2 are rotatably coupled to the clutch housing 22. Although the structure that rotatably couples the first apply plate 44, the second apply plate 54, and the plurality of reaction plates 64 to the clutch housing 22 may vary, this structure may include a first plurality of splines 78 that are disposed along the internal surface 24 of the clutch housing 22. The first plurality of splines 78 extend parallel to the longitudinal axis 30 and engage the first apply plate 44, the second apply plate 54, and the plurality of reaction plates 64 to rotatably couple the first apply plate 44, the second apply plate 54, and the plurality of reaction plates 64 to the clutch housing 22. On the other hand, the plurality of friction plates 62 in FIGS. 1 and 2 are rotatably coupled to the shaft 28. Although the structure that rotatably couples the plurality of friction plates 62 to the shaft 28 may vary, this structure may include a second plurality of splines 80 that are disposed along the outer surface 32 of the shaft 28. The second plurality of splines 80 extend parallel to the longitudinal axis 30 and engage the plurality of friction plates 62 to rotatably couple the shaft 28 with the plurality of friction plates 62. Notwithstanding the foregoing, other types of connections between the first apply plate 44, the second apply plate 54, the plurality of friction plates 62, the plurality of reaction plates 64, the clutch housing 22, and the shaft 28 may be used without departing from the scope of the subject disclosure. It should also be appreciated that the first apply plate 44, the second apply plate 54, the plurality of friction plates 62, and the plurality of reaction plates 64 may be rotatably coupled to either one of the clutch housing 22 or the shaft 28 without departing from the scope of the subject disclosure such that various arrangements and combinations are possible.

In addition to the first actuator 40, the disclosed clutch assembly 20 includes a second actuator 82 disposed adjacent the second end 38 of the clutch pack 34. The second actuator 82 is moveable between an extended position (shown in FIG. 2) and a retracted position (shown in FIG. 1). The second actuator 82 is operable to selectively apply pressure (i.e. force) to the clutch pack 34 in a second direction 84 by transitioning from the retracted position to the extended position. The second direction 84 is substantially parallel with the longitudinal axis 30 and generally points in the direction of the first end 36 of the clutch pack 34 (i.e. to the left in FIG. 2). In response to the pressure applied by the second actuator 82, the second end 38 of the clutch pack 34 moves longitudinally toward the first end 36 of the clutch pack 34. In other words, the pressure applied by second actuator 82 acts in the second direction 84 and forces the second end 38 of the clutch pack 34 longitudinally toward the first end 36 of the clutch pack 34 in the second direction 84. Accordingly, the second direction 84 is opposite the first direction 42 such that the first and second actuators 40, 82 apply pressure to the first and second ends 36, 38 of the clutch pack 34 in opposite, inwardly facing directions. In the example shown in FIGS. 1 and 2, the second actuator 82 also defines the second longitudinal limit 46b of the second apply plate 54 when the second actuator 82 is disposed in the retracted position. In other words, the second apply plate 54 is limited from moving to the right in FIG. 1 beyond the second longitudinal limit 46b by second actuator 82 since the second actuator 82 acts as a stop for the second apply plate 54 when the second actuator 82 is in the retracted position.

In some configurations, including the configurations illustrated in FIGS. 1 through 6, the each friction plate 62 of the plurality of friction plates 62 includes a friction interface 86 disposed on at least one of the first side 66 and the second side 68 of the friction plate 62. The friction interface 86 transfers torque between the friction plate 62 and a directly adjacent reaction plate 64 or one of the first and second apply plates 44, 54 when the clutch pack 34 is compressed by the first actuator 40, the second actuator 82, or both. This torque transfer through the friction interfaces 86 allows the clutch pack 34 to rotatably couple the clutch housing 22 and the shaft 28. As illustrated in FIGS. 1 through 6, the friction interface 86 may be disposed on the first and second sides 66, 68 of each friction plate 62 of the plurality of friction plates 62. In this configuration, rotation of shaft 28 drives rotation of the friction plates 62. When the clutch pack 34 is longitudinally compressed by the first actuator 40 and/or the second actuator 82, the friction interfaces 86 of the friction plates 62 contact the reaction plates 64, the first interior side 50 of the first apply plate 44, and the second interior side 58 of the second apply plate 54 to transmit torque from the shaft 28 to the clutch housing 22. The torque transmission provided by the friction interfaces 86 drives rotation of the clutch housing 22 when the clutch housing 22 is free to rotate. When the clutch assembly 20 is used as a brake, the clutch housing 22 is fixed (i.e. held stationary) and the torque transmission provided by the friction interfaces 86 acts to brake (i.e. slow) the shaft 28. When the clutch assembly 20 is used as a brake, the clutch housing 22 may be fixed to or integrally formed with the transmission case. Such configurations are sometimes referred to as a stationary clutch.

As shown throughout FIGS. 1 through 6, the clutch assembly 20 includes a controller 88 that is operably connected to the first actuator 40 and the second actuator 82. By way of example and without limitation, the controller 88 may be electrically connected to the first actuator 40 and the second actuator 82 by a wire or a conductive trace on a circuit board. In another example, the controller 88 may be disposed in fluid communication with the first actuator 40 and the second actuator 82 by one of more fluid flow paths. The controller 88 may switch the clutch pack 34 to the compressed state by concurrently actuating the first actuator 40 and the second actuator 82 to longitudinally move the first end 36 and the second end 38 of the clutch pack 34 towards each other. This longitudinally compresses the clutch pack 34 between the first actuator 40 and the second actuator 82 to transfer torque through the clutch pack 34 from the shaft 28 to the clutch housing 22. In accordance with an alternative configuration of the clutch assembly 20, the controller 88 switches actuation of the first actuator 40 and the second actuator 82 sequentially for every other engagement of the clutch pack 34. As such, the controller 88 may switch the clutch pack 34 to the compressed state at a first time by actuating the first actuator 40 without actuating the second actuator 82. Actuation of the first actuator 40 at the first time causes the first apply plate 44 to move longitudinally toward the second end 38 of the clutch pack 34 such that the cluck pack 34 is compressed against the second apply plate 54 during a first engagement of the clutch assembly 20. The controller 88 may switch the clutch pack 34 to the compressed state at a second time by actuating the second actuator 82 without actuation of the first actuator 40. The second time is subsequent to the first time. Actuation of the second actuator 82 at the second time causes the second apply plate 54 to move longitudinally toward the first end 36 of the clutch pack 34 such that the clutch pack 34 is compressed against the first apply plate 44 during a subsequent engagement of the clutch assembly 20.

The controller 88 may continue to alternate clutch engagement in this manner so that temperature build-up in the clutch pack 34 alternates between the first and second ends 36, 38 of the clutch pack 34 with each subsequent clutch engagement. Advantageously, this reduces the likelihood of overheating because the cycling time between temperature rises in first end 36 and the second end 38 of the clutch pack 34 is essentially doubled, giving the first end 36 and the second end 38 of the clutch pack 34 more time to cool before the next temperature rise. To this end, the controller 88 may include a processor 90 that counts every engagement of the clutch pack 34 and generates a clutch engagement count identifying the number of times that the clutch pack 34 has been compressed. The controller 88 may further include memory 92 that stores the clutch engagement count such that the processor 90 can increment the clutch engagement count over time. The controller 88 operably switches the clutch pack 34 to the compressed state by actuating the first actuator 40 when the clutch engagement count is an odd number. When the clutch engagement count is an even number, the controller 88 operably switches the clutch pack 34 to the compressed state by actuating the second actuator 82. In this way, the controller 88 engages the clutch pack 34 from alternating ends to reduce localized temperature spikes in the clutch pack 34 resulting from repeated engagements originating from the only one of the first and second ends 36, 38.

A number of different engagement operations are possible using the controller 88. Where the controller 88 actuates only the first actuator 40, the plurality of friction plates 62 and the plurality of reaction plates 64 move longitudinally toward the second apply plate 54 as the first apply plate 44 is driven by the first actuator 40 towards the second apply plate 54. Accordingly, the first apply plate 44 squeezes the plurality of friction plates 62 and the plurality of reaction plates 64 against the second apply plate 54 when the controller 88 actuates only the first actuator 40. In this way, the second apply plate 54 acts as a backing plate. Where the controller 88 actuates only the second actuator 82, the plurality of friction plates 62 and the plurality of reaction plates 64 move longitudinally toward the first apply plate 44 as the second apply plate 54 is driven by the second actuator 82 towards the first apply plate 44. Accordingly, the second apply plate 54 squeezes the plurality of friction plates 62 and the plurality of reaction plates 64 against the first apply plate 44 when the controller 88 actuates only the second actuator 40. In this way, the first apply plate 44 acts as a backing plate. Where the controller 88 concurrently actuates both the first actuator 40 and the second actuator 82, the plurality of friction plates 62 and the plurality of reaction plates 64 are squeezed together between the first apply plate 44 and the second apply plate 54 as the first apply plate 44 and the second apply plate 54 move longitudinally toward one another at the same time.

In the configurations shown throughout FIGS. 1 through 6, the first actuator 40 and the second actuator 82 are hydraulically actuated. Accordingly, the controller 88 may include a valve 94. The valve 94 is disposed in fluid communication with a pressurized fluid source (not shown). Where the controller 88 calls for the concurrent actuation of the first actuator 40 and the second actuator 82, the valve 94 concurrently supplies fluid to both the first actuator 40 and the second actuator 82. Where the controller 88 calls for the sequential actuation of the first actuator 40 and the second actuator 82, the valve 94 selectively and independently supplies fluid to the first actuator 40 at the first time and selectively and independently supplies fluid to the second actuator 82 at the second time. As such, the valve 94 may include a mechanical switch 96 that sequentially switches fluid flow to only the first actuator 40, to only the second actuator 82, or to both the first and second actuators 40, 82. To this end, the mechanical switch 96 may operate to move the valve 94 between various positions, each providing different fluid flows to the first and second actuators 40, 82. By way of example and without limitation, the mechanical switch 96 may be electrically controlled by the controller 88 or the mechanical switch 96 may alternatively be hydraulically driven, cam driven, or spring driven. Notwithstanding the examples illustrated and described herein, where the first and second actuators 40, 82 are fluid operated hydraulic actuators, the first and second actuators 40, 82 may alternatively be, without limitation, mechanical, electrical, or electro-mechanical actuators.

In the configuration shown in FIGS. 1 and 2, the clutch pack 34 extends longitudinally between the first actuator 40 and the second actuator 82. The clutch housing 22 extends inwardly adjacent to both the first apply plate 44 and the second apply plate 54 and houses both the first actuator 40 and the second actuator 82. The first and second actuators 40, 82 each include an actuator cavity 98 and a piston 100. The actuator cavities 98 are disposed in and may be defined by the clutch housing 22 and the pistons 100 are received in the actuator cavities 98 with one piston 100 per actuator cavity 98. Fluid pressure within the actuator cavities 98 acts on the pistons 100 causing the pistons 100 to translate longitudinally toward or away from the clutch pack 34. The controller 88 controls fluid flow to the actuator cavities 98 and therefore controls the fluid pressure within the actuator cavities 98. In this way, the controller 88 can actuate the first and second actuators 40, 82 and drive movement of the first and second apply plates 44, 54. Optionally, a spring (not shown) may be disposed within each of the actuator cavities 98 that contacts the piston 100 to bias the piston 100 in a direction away from the clutch pack 34 to a default position. Again, the first actuator 40 and the second actuator 82 are each moveable between the extended position and the retracted position. The pistons 100 extend from the actuator cavities 98 when fluid pressure within the actuator cavities 98 is increased and the pistons 100 retract into the actuator cavities 98 when fluid pressure within the actuator cavities 98 is decreased.

Figure 3:
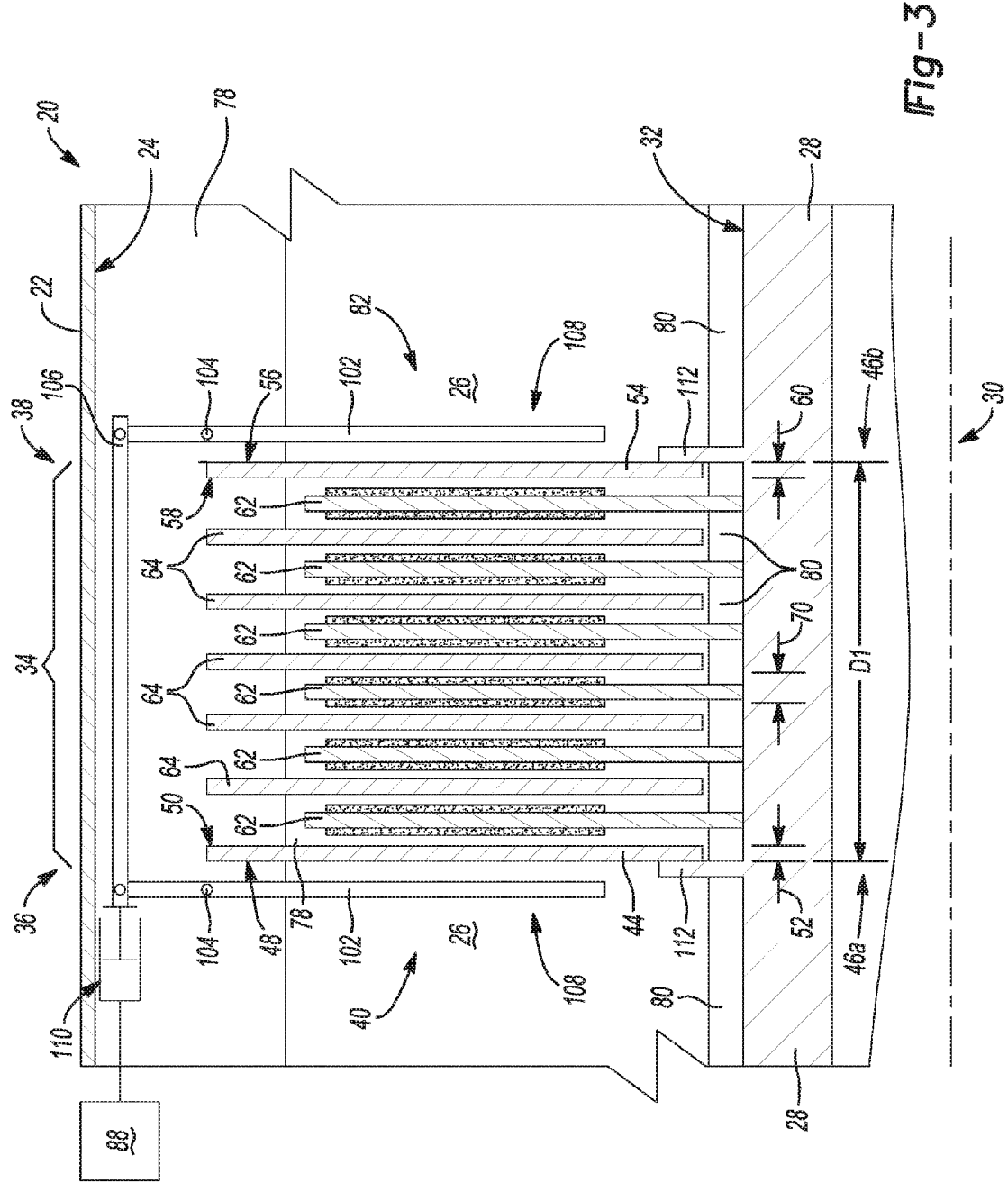
FIG. 3 is a partial, cross-sectional view of another exemplary clutch assembly constructed in accordance with the subject disclosure where the clutch assembly is shown in an uncompressed state.
Figure 4:
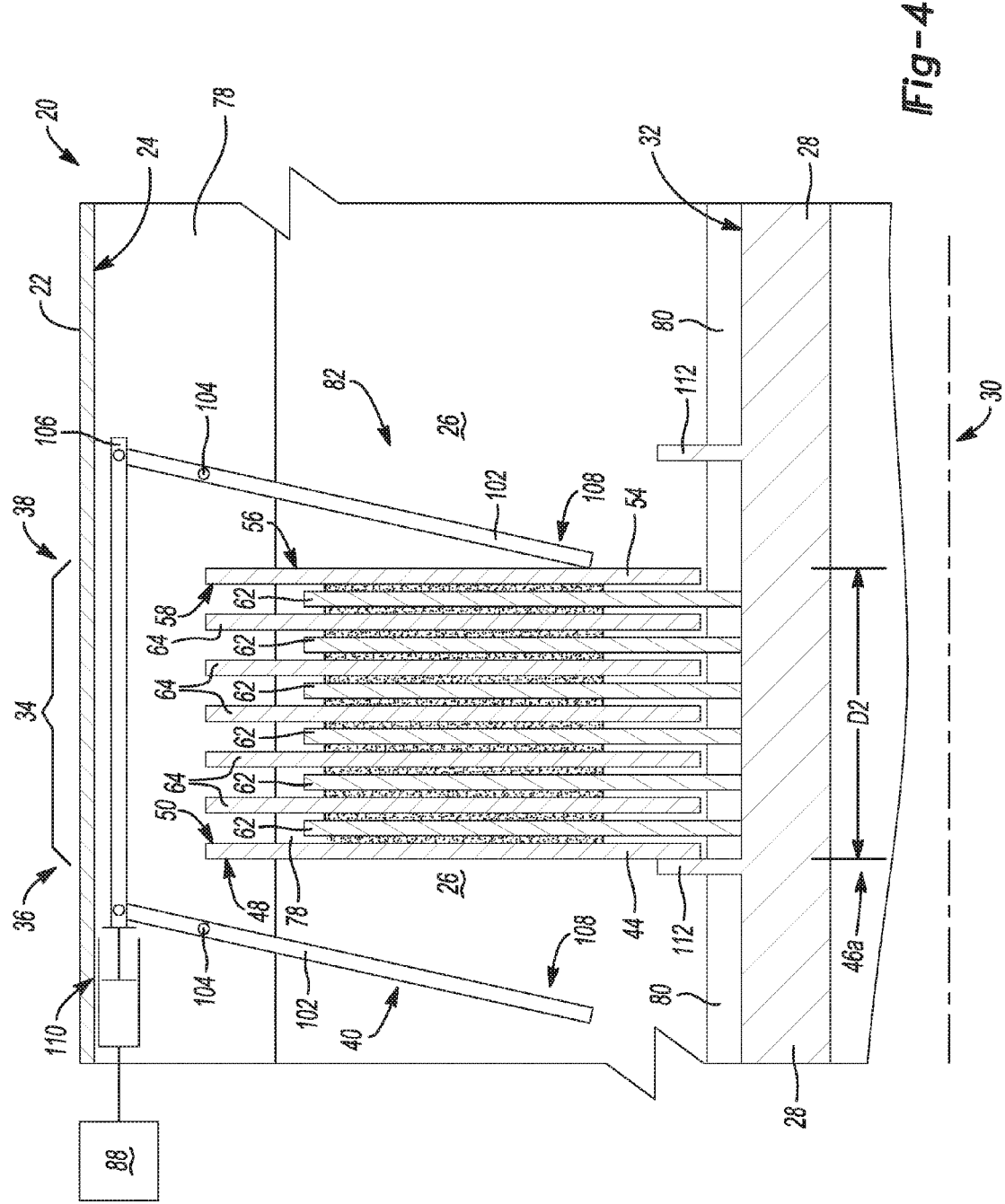
FIG. 4 is a partial, cross-sectional view of the clutch assembly of FIG. 3 where the clutch assembly is shown in a compressed state.

In the configuration shown in FIGS. 3 and 4, the first and second actuators 40, 82 each include a rocker arm 102 and a pivot 104 that connects each rocker arm 102 to the clutch housing 22. A rocker arm driver 106 applies pressure to the rocker arms 102 to rotate the rocker arms 102 about their respective pivots 104. The rocker arm driver 106 may extend longitudinally through or along the clutch housing 22 and the rocker arms 102 may be disposed to each side of the clutch pack 34 and may extend radially from the rocker arm driver 106 into the inner cavity 26. As shown in FIGS. 3 and 4, the rocker arm driver 106 may be pivotally connected to both of the rocker arms 102. Each of the rocker arms 102 has an engagement portion 108 that is spaced from the pivot 104 opposite the rocker arm driver 106. Accordingly, the pivots 104 are disposed along the rocker arms 102 between the engagement portions 108 of the rocker arms 102 and the rocker arm driver 106. The engagement portions 106 of the rocker arms 102 alternate to contact the first and second ends 36, 38 of the clutch pack 34 in response to rotation of the rocker arms 102 about the pivots 104. A single actuator 110 may be coupled to the rocker arm driver 106. Like the first and second actuators 40, 82 described above, the single actuator 110 is connected to and controller by the controller 88. The single actuator 110 may be any type of actuator that can effectuate movement in the longitudinal direction, such as an electrical, mechanical, and/or hydraulic actuator. The single actuator 110 is operable to move the rocker arm driver 106 longitudinally, which causes rotation of the rocker arms 102 such that the engagement portion 108 of one of the rocker arms 102 is moved into contact with the clutch pack 34 while the engagement portion of the other one of the rocker arms 102 is moved away from the clutch pack 34. In FIG. 3, the clutch assembly 20 is shown with the clutch pack in the uncompressed state. By contrast, the clutch assembly 20 is shown with the clutch pack 34 in the compressed state in FIG. 4. In FIG. 4, the single actuator 110 has displaced the rocker arm driver 106 to the right, which has produced clockwise rotation of the rocker arms 102. Further, one of the engagement portions 108 of the rocker arms 102 has been moved into contact with the second apply plate 54. The second apply plate 54 therefore moves longitudinally toward the first apply plate 44 and compresses the clutch pack 34. The first and second apply plates 44, 54 are retained relative to the clutch housing 22 and the shaft 28 such that the first and second apply plates 44, 54 cannot move longitudinally beyond predetermined limits 46a, 46b. Although the structure that stops the first and second plates 44, 54 at the predetermined limits 46a, 46b may vary, in the configuration shown in FIGS. 3 and 4, this structure includes a pair of opposing retainers 112. The pair of opposing retainers 112 extend annularly from the outer surface 32 of the shaft 28 to define the predetermined limits 46a, 46b. The pair of opposing retainers 112 project into the inner cavity 26 to abut the first exterior side 48 of the first apply plate 44 and the second exterior side 56 of the second apply plate 54, respectively, to prevent the first and second apply plates 44, 54 from moving longitudinally outward beyond the predetermined limits 46a, 46b. It should be appreciated that other types of the structure may be used for retaining the first and second apply plates 44, 54 longitudinally between the predetermined limits 46a, 46b. By way of example and without limitation, the first and second apply plates 44, 54 may be fixedly connected to the clutch housing 22 such that the first and second apply plates 44, 54 cannot move longitudinally with respect to the clutch housing 22 in either direction.

Figure 5:
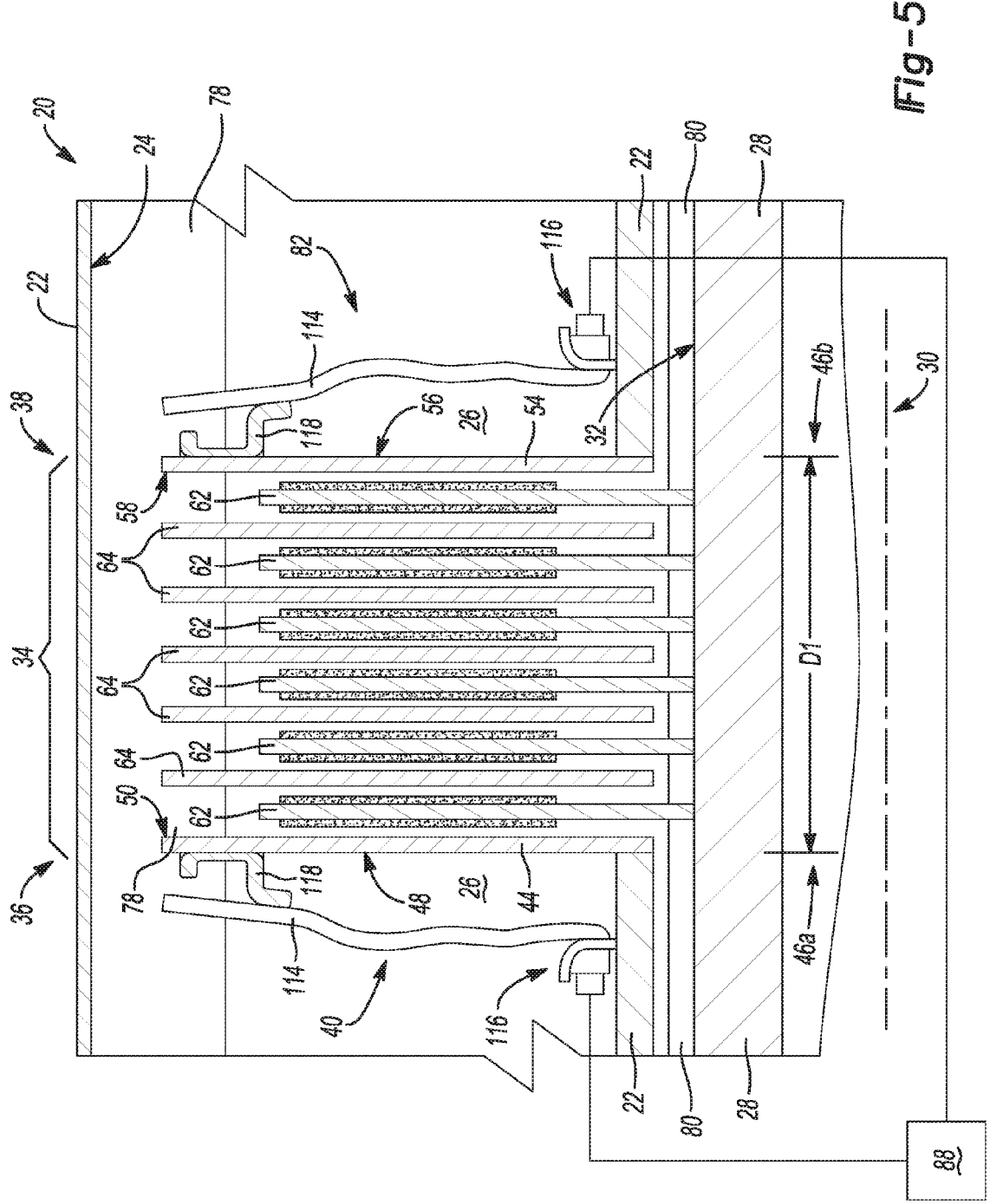
FIG. 5 is a partial, cross-sectional view of another exemplary clutch assembly constructed in accordance with the subject disclosure where the clutch assembly is shown in an uncompressed state.

In the configuration shown in FIGS. 5 and 6, the first and second actuators 40, 82 each include a lever 114 that is carried on the clutch housing 22. A lever driver 116 extends between the clutch housing 22 and each of the levers 114. The lever drivers 116 apply pressure to the levers 114 to longitudinally displace the levers 114 toward and away from the clutch pack 34. The levers 114 extend radially from the clutch housing 22 and into the inner cavity 26. Each of the levers 114 has an engagement surface 118 that faces the clutch pack 34. Each lever 114 may generally extend between the lever driver 116 and the engagement surface 118 such that the lever driver 116 and the engagement surface 118 are disposed at opposite ends of the lever 114. The engagement surfaces 118 of the levers 114 selectively contact the first and second ends 36, 38 of the clutch pack 34 in response to longitudinal movement of the levers 114 toward the clutch pack 34. Like the single actuator 110 described above, the lever drivers 116 are connected to and controlled by the controller 88. The lever drivers 116 may be any type of actuator that can effectuate movement in the longitudinal direction. In FIG. 5, the clutch assembly 20 is shown with the clutch pack in the uncompressed state. In the uncompressed state, the levers 114 prevent the first and second apply plates 44, 54 from moving longitudinally outwardly beyond the predetermined limits 46a, 46b. By contrast, the clutch assembly 20 is shown with the clutch pack 34 in the compressed state in FIG. 6. In FIG. 6, the lever drivers 116 have concurrently displaced both levers 114 towards the clutch pack 34 such that the engagement surfaces 118 of the levers 114 have been moved into contact with the first exterior side 48 of the first apply plate 44 and the second exterior side 56 of the second apply plate 54 to compress the clutch pack 34.

Various alternative configurations are possible where the first apply plate 44, the second apply plate 54, the plurality of friction plates 62, and the plurality of reaction plates 64 are rotatably coupled to either the clutch housing 22 or the shaft 28 in different combinations. All such combination are considered to be encompassed by the scope of the subject disclosure. Additionally, it should be appreciated that the several views of the clutch assembly 20 in the Figures are partial cross-sectional views. Accordingly, the first and second actuators 40, 82 may be multiple actuators that individually apply pressure to the first and second apply plates 44, 54. The disclosed clutch assembly 20 may also adjust torque transmission through the clutch pack 34 by varying the pressure that the first and second actuators 40, 54 apply to the first and second apply plates 44, 54. Under such a configuration, the first and second actuators 40, 82 may include sets of multiple actuators that apply different pressures to the first and second apply plates 44, 54, respectively. It should be appreciated that the first and second actuators 40, 82 may be oppositely oriented than as shown such that the first and second actuators 40, 82 pull on the first and/or second apply plates 44, 54 rather than pushing the first and second apply plates 44, 54 (as shown). Although not shown in the Figures, one, some, or all of the reaction plates 64, the friction plates 62, and the first and second apply plates 44, 54 may be biased to certain longitudinal positions. By way of example and without limitation, such biasing may be accomplished by springs, actuators, inertia, or hydraulic pressure within the inner cavity 26. It should also be appreciated that although the Figures illustrate wet-clutch assemblies, where the inner cavity 26 contains a fluid, the subject disclosure also applies to dry-clutch assemblies.

Referring to FIGS. 7A through 7C, FIGS. 8A through 8C, and FIGS. 9A through 9C, a method of engaging the clutch assembly 20 described above is illustrated. As explained above, the clutch assembly 20 generally includes shaft 28, clutch housing 22, and clutch pack 34. The clutch pack 34 includes first apply plate 44 and second apply plate 54. The plurality of friction plates 62 and the plurality of reaction plates 64 are disposed between the first apply plate 44 and the second apply plate 54 in an interleaving relationship. The method generally includes the steps of: applying torque to the shaft 28, preventing the first apply plate 44 from traveling longitudinally beyond predetermined limit 46a measured relative to the shaft 28 and the clutch housing 22, and preventing the second apply plate 54 from traveling longitudinally beyond predetermined limit 46b measured relative to the shaft 28 and the clutch housing 22.

Figure 7A:
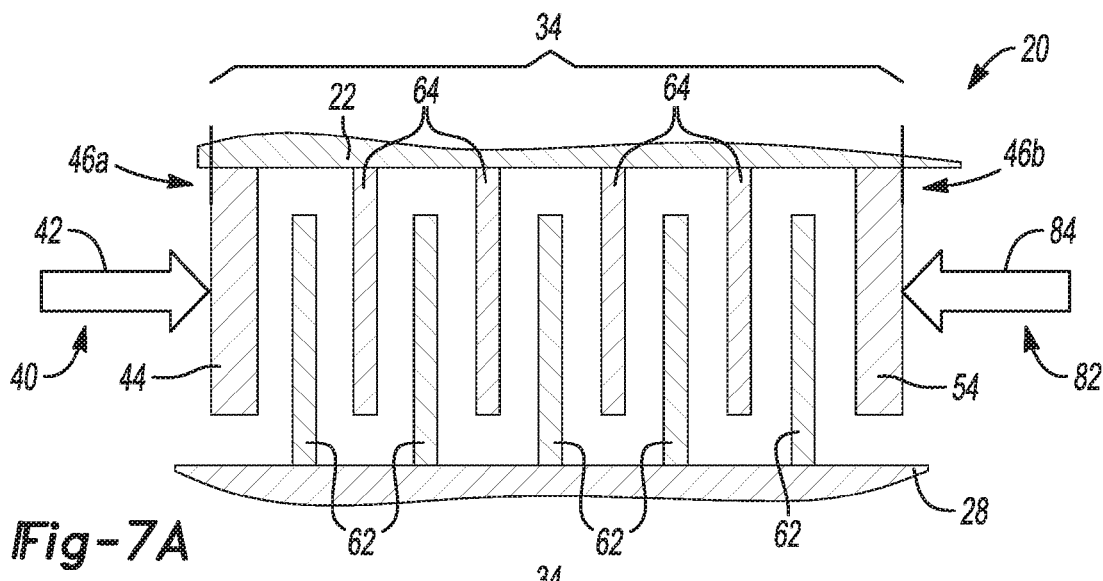
FIG. 7A is a partial, cross-sectional view of the clutch assembly of FIG. 1 illustrating an exemplary engagement method of the clutch pack where the clutch assembly is shown in an uncompressed state.
Figure 7B:
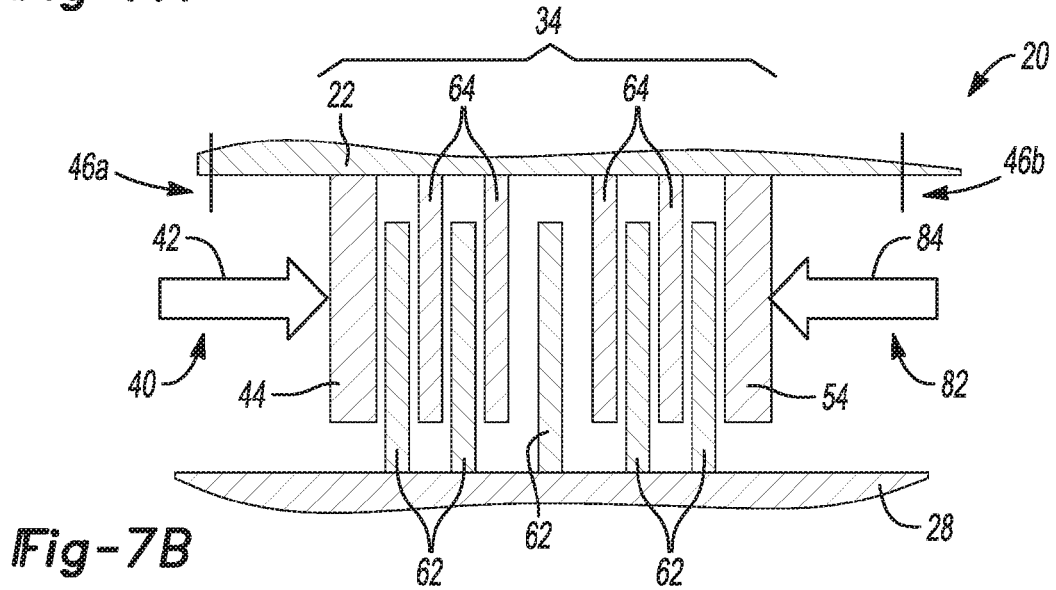
FIG. 7B is a partial, cross-sectional view of the clutch assembly of FIG. 7A where the clutch assembly is shown transitioning from the uncompressed state to a compressed state.
Figure 7C:
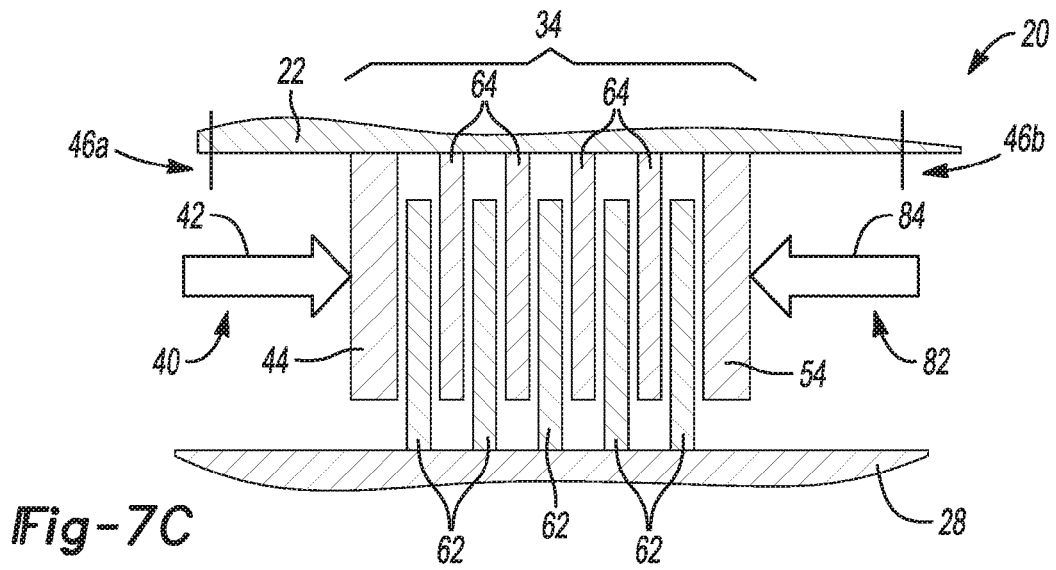
FIG. 7C is a partial, cross-sectional view of the clutch assembly of FIG. 7A where the clutch assembly is shown in the compressed state.
Figure 8A:
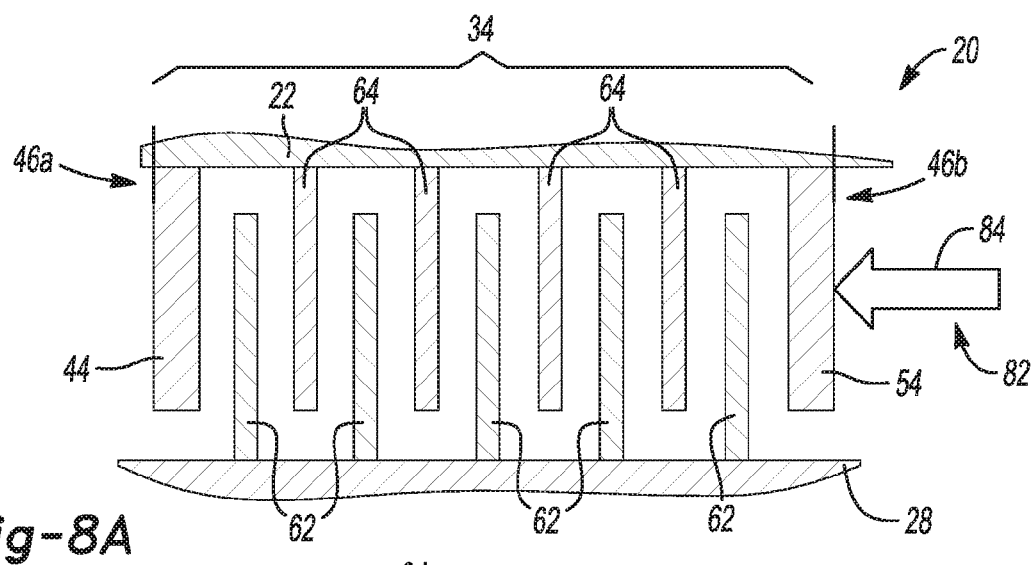
FIG. 8A is a partial, cross-sectional view of the clutch assembly of FIG. 1 illustrating another exemplary engagement method of the clutch pack where the clutch assembly is shown in an uncompressed state.
Figure 8B:
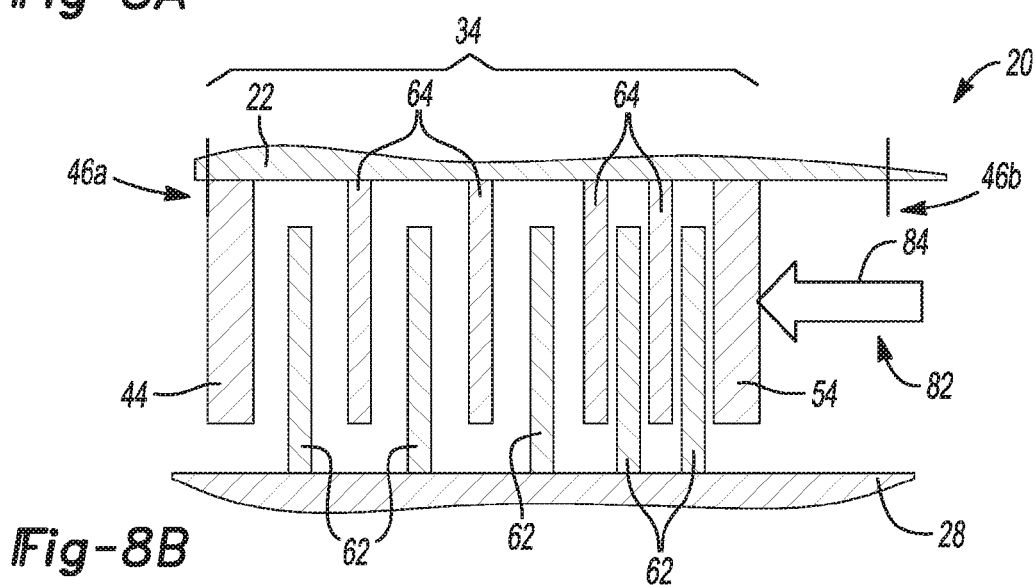
FIG. 8B is a partial, cross-sectional view of the clutch assembly of FIG. 8A where the clutch assembly is shown transitioning from the uncompressed state to a compressed state.
Figure 8C:
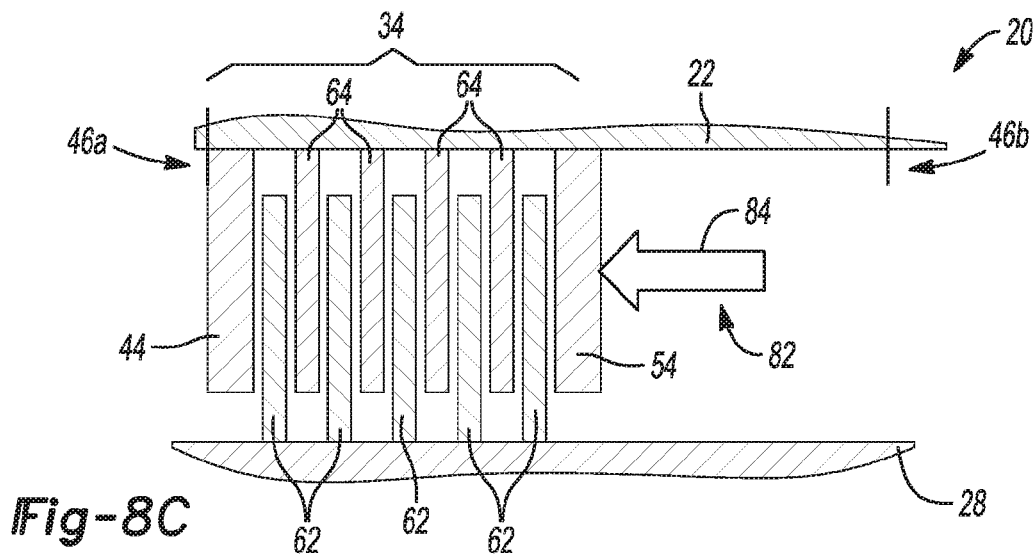
FIG. 8C is a partial, cross-sectional view of the clutch assembly of FIG. 8A where the clutch assembly is shown in the compressed state.
Figure 9A:
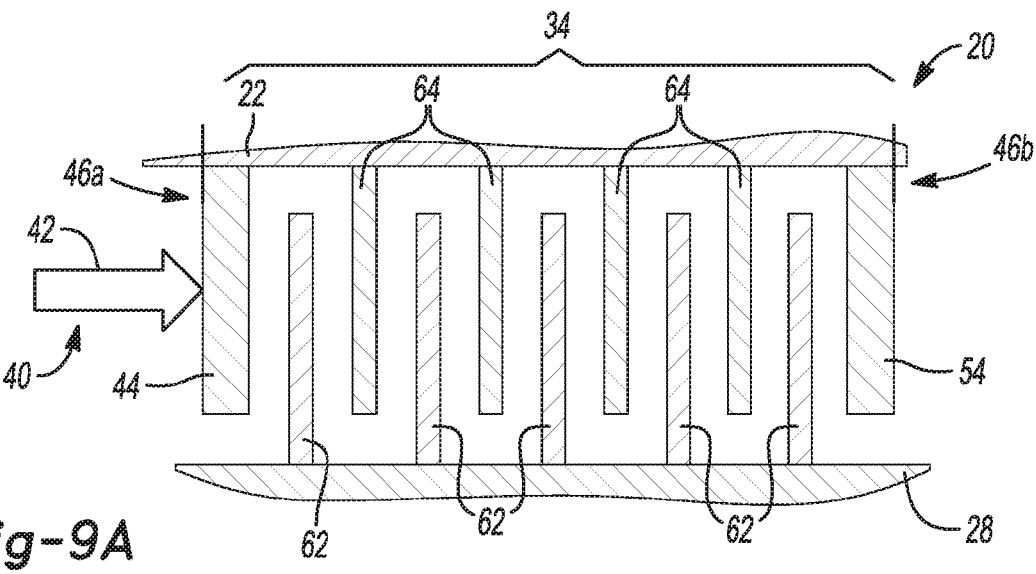
FIG. 9A is a partial, cross-sectional view of the clutch assembly of FIG. 1 illustrating a continuation of the exemplary engagement method of the clutch pack shown in FIGS. 8A-8C where the clutch assembly is shown in an uncompressed state.
Figure 9B:
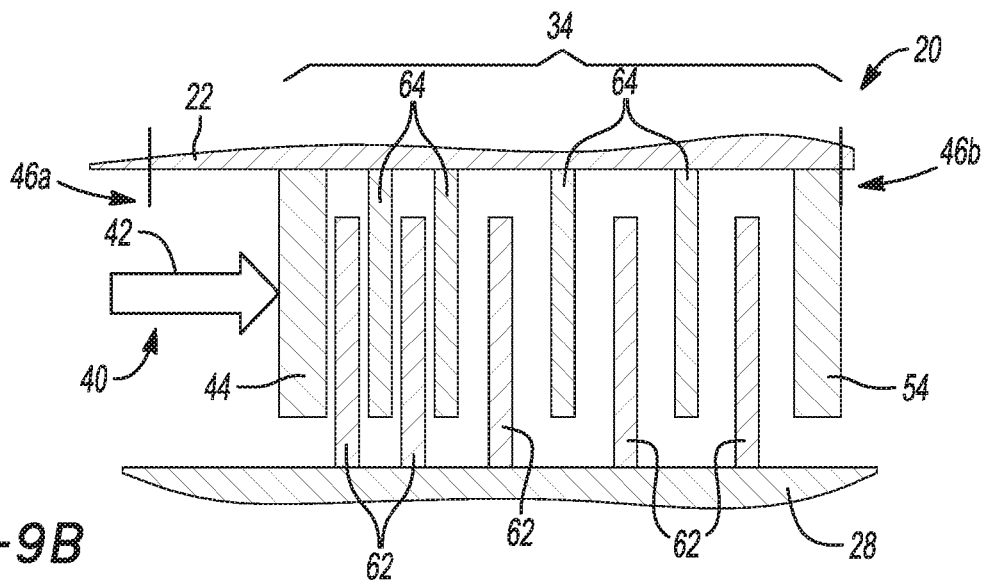
FIG. 9B is a partial, cross-sectional view of the clutch assembly of FIG. 9A where the clutch assembly is shown transitioning from the uncompressed state to a compressed state.
Figure 9C:
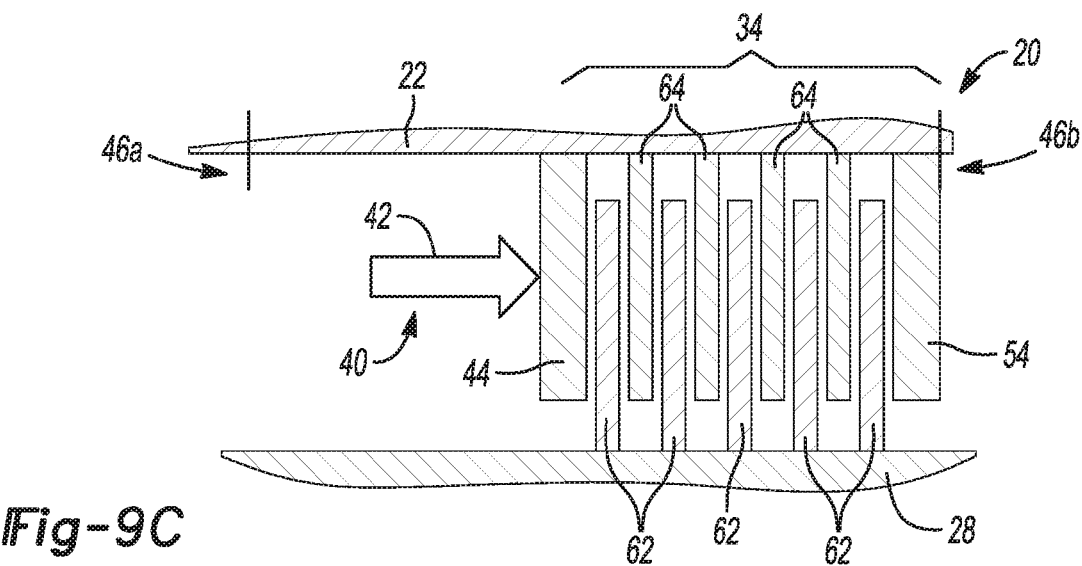
FIG. 9C is a partial, cross-sectional view of the clutch assembly of FIG. 9A where the clutch assembly is shown in the compressed state.

In accordance with the method illustrated in FIGS. 7A through 7C, the method further includes the step of switching the clutch pack to a compressed state by concurrently applying pressure to the first and second apply plates 44, 54 in opposing directions 42, 84 that converge inwardly toward the plurality of friction plates 62 and the plurality of reaction plates 64. As a result of this step, the first and second apply plates 44, 54 move longitudinal toward one another and longitudinally compress the plurality of friction plates 62 and the plurality of reaction plates 64 between the first apply plate 44 and the second apply plate 54 to transfer torque from the shaft 28 to the clutch housing 22 via the clutch pack 34. Advantageously, this engagement methodology reduces localized temperature spikes in the clutch pack 34 adjacent to one of the first and second apply plates 44, 54 because torque from the shaft 28 is split between at least two longitudinally spaced friction interfaces during clutch engagement and therefore more evenly heats up two longitudinally spaced regions of the clutch pack 34. This creates more uniform temperatures across the clutch pack 34 in comparison to other designs where torque and thus heat generation is localized at a single friction interface disposed at one end of the clutch pack 34.

In accordance with the method illustrated in FIGS. 8A through 8C and FIGS. 9A through 9C, the method further includes the steps of: switching the clutch pack 34 to a compressed state at a first time by applying pressure to the first apply plate 44 to move the first apply plate 44 longitudinally toward the second apply plate 54, compressing the plurality of reaction plates 64 and the plurality of friction plates 62 between the first apply plate 44 and the second apply plate 54 at the first time to transfer torque from the shaft 28 to the clutch housing 22 via the clutch pack 34, and switching the clutch pack 34 to an uncompressed state at a second time by relieving the pressure on the first apply plate 44 to move the first apply plate 44 longitudinally away from the second apply plate 54 thereby allowing the clutch pack 34 to expand longitudinally. The method also includes the step of switching the clutch pack 34 back to the compressed state at a third time by applying pressure to the second apply plate 54 to move the second apply plate 54 longitudinally toward the first apply plate 44 and the step of compressing the plurality of reaction plates 64 and the plurality of friction plates 62 between the first apply plate 44 and the second apply plate 54 at the third time to transfer torque from the shaft 28 to the clutch housing 22 via the clutch pack 34. In accordance with the method, the second time is subsequent to the first time and the third time is subsequent to the second time. For example and without limitation, the third time (where pressure is applied in the second direction 84 to the second apply plate 54) may be later than the second time (where pressure is relieved from the first apply plate 44) and the second time may be later than the first time (where pressure is applied in the first direction 42 to the first apply plate 44). In this way, temperature spikes in the clutch pack 34 can be switched from at or near the first apply plate 44 to at or near the second apply plate 54 with every other clutch engagement to reduce localized heat build-up in the clutch pack 34 resulting from repeated engagements of the clutch pack 34 during a short time span.

To this end, the method may further include the steps of: counting each time the clutch pack 34 is switched to the compressed state, generating a clutch engagement count identifying the number of times the clutch pack 34 has been switched to the compressed state, storing the clutch engagement count in memory, switching the clutch pack 34 to the compressed state by applying pressure to the first apply plate 44 in the first direction 42 when the clutch engagement count is an odd number, and switching the clutch pack 34 to the compressed state by applying pressure to the second apply plate 54 in the second direction 84 when the clutch engagement count is an even number. The method may also utilize a numerical model control scheme that accounts for clutch temperature and wear. The step of switching the clutch pack 34 to the compressed state at the first time may include controlling the first actuator 40 to apply pressure to the first apply plate 44 in the first direction 42 and the step of switching the clutch pack 34 back to the compressed state at the third time may include controlling the second actuator 82 to apply pressure to the second apply plate 54 in the second direction 84. Where the first and second actuators 40, 82 are hydraulically actuated, the first and second actuators 40, 82 may be controlled by sequentially switching fluid flow to the first actuator 40 and the second actuator 82.

As explained above, the engagement of the clutch pack 34 may act to either drive rotation of the clutch housing 22 or to brake the shaft 28. Where engagement of the clutch pack 34 drives rotation of the clutch housing 22, the steps of compressing the plurality of reaction plates 64 and the plurality of friction plates 62 between the first apply plate 44 and the second apply plate 54 at the first and third times causes the clutch housing 22 to rotate at the same speed as the shaft 28. Where the clutch pack 34 acts as a brake, the clutch housing 22 is rotationally fixed and the steps of compressing the plurality of reaction plates 64 and the plurality of friction plates 62 between the first apply plate 44 and the second apply plate 54 at the first and third times slows rotation of the shaft 28.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A clutch assembly comprising:
   a clutch housing having an internal surface that defines an inner cavity within said clutch housing;
   a shaft disposed within said inner cavity of said clutch housing, said shaft extending along a longitudinal axis and having an outer surface;
   a clutch pack disposed radially between said clutch housing and said shaft, said clutch pack being moveable between an uncompressed state where said clutch housing and said shaft are free to rotate relative to one another and a compressed state where said clutch pack rotatably couples said clutch housing and said shaft such that said clutch housing and said shaft rotate together;
   said clutch pack including a first end and a second end opposite said first end, said second end of said clutch pack being longitudinally spaced from said first end of said clutch pack;
   said clutch pack including a first apply plate disposed at said first end of said clutch pack, said first apply plate being moveable along said longitudinal axis relative to said clutch housing and said shaft;
   said clutch pack including a second apply plate disposed at said second end of said clutch pack, said second apply plate being moveable along said longitudinal axis relative to said clutch housing and said shaft;
   said clutch pack including a plurality of friction plates disposed between said first apply plate and said second apply plate, said plurality of friction plates being moveable along said longitudinal axis relative to said clutch housing and said shaft;
   said clutch pack including a plurality of reaction plates disposed between said first apply plate and said second apply plate in an interleaving relationship with said plurality of friction plates, said plurality of reaction plates being moveable along said longitudinal axis relative to said clutch housing and said shaft;
   a first actuator that selectively applies pressure to said first end of said clutch pack in a first direction to move said first end of said clutch pack toward said second end of said clutch pack; and
   a second actuator that selectively applies pressure to said second end of said clutch pack in a second direction that is opposite said first direction to move said second end of said clutch pack toward said first end of said clutch pack.

2. The clutch assembly as set forth in claim 1 wherein said clutch pack extends longitudinally between said first actuator and said second actuator.

3. The clutch assembly as set forth in claim 2 wherein said first actuator and said second actuator are each moveable between an extended position and a retracted position, said first actuator defining a first longitudinal limit in said retracted position where said first apply plate is limited from moving further away from said second end of said clutch pack by said first actuator, and said second actuator defining a second longitudinal limit in said retracted position where said second apply plate is limited from moving further away from said first end of said clutch pack by said second actuator.

4. The clutch assembly as set forth in claim 3 wherein said clutch pack is in said uncompressed state when said first actuator and said second actuator are both in said retracted position.

5. The clutch assembly as set forth in claim 4 wherein said clutch pack is in said compressed state when at least one of said first actuator and said second actuator is in said extended position.

6. The clutch assembly as set forth in claim 4 wherein said clutch pack is in said compressed state when said first actuator and said second actuator are both in said extended position.

7. The clutch assembly as set forth in claim 1 further comprising:
a pair of opposing retainers extending into said inner cavity from at least one of said shaft and said clutch housing, said pair of opposing retainers defining a first longitudinal limit and a second longitudinal limit for said clutch pack respectively, wherein said first apply plate is limited from moving further away from said second end of said clutch pack at said first longitudinal limit, and wherein said second apply plate is limited from moving further away from said first end of said clutch pack at said second longitudinal limit.

8. The clutch assembly as set forth in claim 1 wherein said first and second actuators each include an actuator cavity and a piston that is received in said actuator cavity, said piston extending from said actuator cavity when fluid pressure in said actuator cavity is increased and said piston retracting into said actuator cavity when fluid pressure in said actuator cavity is decreased.

9. The clutch assembly as set forth in claim 1 wherein said first and second actuators each include a rocker arm, a pivot that connects said rocker arm to said clutch housing, and a rocker arm driver that applies pressure to said rocker arm to rotate said rocker arm, each of said rocker arms having an engagement portion that is spaced from said pivot, said engagement portions of said rocker arms selectively contacting said first and second ends of said clutch pack in response to rotation of said rocker arms about said pivots.

10. The clutch assembly as set forth in claim 1 wherein said first and second actuators each include a lever carried on said clutch housing and a lever driver that applies pressure to said lever to longitudinally displace said lever, each of said levers extending radially from said clutch housing and into said inner cavity, each of said levers having an engagement surface facing said clutch pack, said engagement surfaces of said levers selectively contacting said first and second ends of said clutch pack in response to longitudinal movement of said levers toward said clutch pack.

11. The clutch assembly as set forth in claim 1 further comprising:
a controller operably connected to said first actuator and said second actuator, wherein said controller switches said clutch pack to said compressed state by concurrently actuating said first actuator and said second actuator to longitudinally move said first end and said second end of said clutch pack towards each other in order to longitudinally compress said clutch pack between said first actuator and said second actuator.

12. The clutch assembly as set forth in claim 11 wherein said first actuator and said second actuator are hydraulically actuated and wherein said controller includes a valve that selectively supplies fluid to said first actuator and said second actuator.

13. The clutch assembly as set forth in claim 1 further comprising:
a controller operably connected to said first actuator and said second actuator, wherein said controller switches actuation of said first actuator and said second actuator sequentially for every other engagement of said clutch pack, wherein said controller switches said clutch pack to said compressed state at a first time by actuating said first actuator to longitudinally move said first apply plate toward said second end of said clutch pack, and wherein said controller switches said clutch pack to said compressed state at a second time by actuating said second actuator to longitudinally move said second apply plate toward said first end of said clutch pack, said second time being subsequent to said first time.

14. The clutch assembly as set forth in claim 13 wherein controller includes a processor that counts every engagement of said clutch pack and generates a clutch engagement count and wherein said controller includes memory that stores said clutch engagement count.

15. The clutch assembly as set forth in claim 14 wherein said controller switches said clutch pack to said compressed state by actuating said first actuator when said clutch engagement count is an odd number and wherein said controller switches said clutch pack to said compressed state by actuating said second actuator when said clutch engagement count is an even number.

16. The clutch assembly as set forth in claim 13 wherein said first actuator and said second actuator are hydraulically actuated and wherein said controller includes a valve that selectively and independently supplies fluid to said first actuator and said second actuator.

17. The clutch assembly as set forth in claim 16 wherein said valve includes a mechanical switch that sequentially switches fluid flow to said first actuator and said second actuator.

18. A clutch assembly comprising:
a clutch housing having an internal surface that defines an inner cavity within said clutch housing;
a shaft disposed within said inner cavity of said clutch housing, said shaft extending along a longitudinal axis and having an outer surface;
a clutch pack disposed radially between said clutch housing and said shaft that selectively couples rotation of said clutch housing and said shaft, said clutch pack being moveable between an uncompressed state and a compressed state;
said clutch pack including a first apply plate slidably retained on one of said clutch housing and said shaft such that said first apply plate is moveable along said longitudinal axis relative to said clutch housing and said shaft;
said clutch pack including a second apply plate slidably retained on one of said clutch housing and said shaft such that said second apply plate is moveable along said longitudinal axis relative to said clutch housing and said shaft;
said clutch pack including a plurality of friction plates disposed longitudinally between said first apply plate and said second apply plate, said plurality of friction plates being slidably retained on one of said clutch housing and said shaft such that each friction plate of said plurality of friction plates is moveable along said longitudinal axis relative to said clutch housing and said shaft;
said clutch pack including a plurality of reaction plates disposed longitudinally between said first apply plate and said second apply plate in an interleaving relationship with said plurality of friction plates, said plurality of reaction plates being slidably retained on one of said clutch housing and said shaft such that each reaction plate of said plurality of reaction plates is moveable along said longitudinal axis relative to said clutch housing and said shaft;
a first actuator that selectively applies pressure to said first apply plate in a first direction to move said first apply plate toward said second apply plate; and a second actuator that selectively applies pressure to said second apply plate in a second direction that is opposite said first direction to move said second apply plate toward said first apply plate in order to reduce localized temperature spikes in said clutch pack adjacent said first apply plate when said clutch pack is switched to said compressed state.

19. The clutch assembly as set forth in claim 18 wherein said plurality of friction plates and said plurality of reaction plates move longitudinally toward said second apply plate as said first apply plate moves toward said second apply plate such that said plurality of friction plates and said plurality of reaction plates are squeezed together between said first apply plate and said second apply plate in response to actuation of only said first actuator.

20. The clutch assembly as set forth in claim 18 wherein said plurality of friction plates and said plurality of reaction plates move longitudinally toward said first apply plate as said second apply plate moves toward said first apply plate such that said plurality of friction plates and said plurality of reaction plates are squeezed together between said first apply plate and said second apply plate in response to actuation of only said second actuator.

21. The clutch assembly as set forth in claim 18 wherein said plurality of friction plates and said plurality of reaction plates are longitudinally compressed as said first apply plate and said second apply plate move toward one another such that said plurality of friction plates and said plurality of reaction plates are squeezed together between said first apply plate and said second apply plate in response to concurrent actuation of said first actuator and said second actuator.

22. The clutch assembly as set forth in claim 18 wherein said first apply plate, said second apply plate, and said plurality of reaction plates are rotatably coupled to said clutch housing by a first plurality of splines disposed along said internal surface of said clutch housing such that said first apply plate, said second apply plate, and said plurality of reaction plates rotate with said clutch housing.

23. The clutch assembly as set forth in claim 22 wherein said plurality of friction plates are rotatably coupled to said shaft by a second plurality of splines disposed along said outer surface of said shaft such that said plurality of friction plates rotate with said shaft.

24. The clutch assembly as set forth in claim 18 wherein said plurality of friction plates are rotatably coupled to said clutch housing by a first plurality of splines disposed along said internal surface of said clutch housing such that said plurality of friction plates rotate with said clutch housing.

25. The clutch assembly as set forth in claim 24 wherein said first apply plate, said second apply plate, and plurality of reaction plates are rotatably coupled to said shaft by a second plurality of splines disposed along said outer surface of said shaft such that said first apply plate, said second apply plate, and said plurality of reaction plates rotate with said shaft.

26. The clutch assembly as set forth in claim 18 wherein each friction plate of said plurality of friction plates has an annular shape and a first side and a second side that is longitudinally spaced from said first side, each friction plate of said plurality of friction plates including a friction interface disposed on at least one of said first side and said second side, said friction interfaces operably transferring torque between said plurality of friction plates and said plurality of reaction plates when said clutch pack is in said compressed state to rotatably couple said clutch housing and said shaft such that said clutch housing rotates with said shaft.

27. A method of engaging a clutch assembly having a shaft, a clutch housing, and a clutch pack including a first apply plate, a second apply plate, and a plurality of friction plates and reaction plates disposed between the first apply plate and the second apply plate in an interleaving relationship, the method comprising the steps of:
applying torque to the shaft;
preventing the first apply plate from traveling longitudinally beyond a first longitudinal limit measured relative to the shaft and the clutch housing;
preventing the second apply plate from traveling longitudinally beyond a second longitudinal limit measured relative to the shaft and the clutch housing;
switching the clutch pack to a compressed state at a first time by applying pressure to the first apply plate to move the first apply plate longitudinally toward the second apply plate and thereby compress the plurality of friction plates and reaction plates between the first apply plate and the second apply plate at the first time in order to transfer torque from the shaft to the clutch housing via the clutch pack;
switching the clutch pack to an uncompressed state at a second time by relieving the pressure on the first apply plate to move the first apply plate longitudinally away from the second apply plate and thereby allow the clutch pack to expand longitudinally; and
switching the clutch pack back to the compressed state at a third time by applying pressure to the second apply plate to move the second apply plate longitudinally toward the first apply plate and thereby compress the plurality of friction and reaction plates between the first apply plate and the second apply plate at the third time in order to transfer torque from the shaft to the clutch housing via the clutch pack.

28. The method as set forth in claim 27 further comprising the steps of:
counting each time the clutch pack is switched to the compressed state;
generating a clutch engagement count identifying the number of times the clutch pack has been switched to the compressed state;
storing the clutch engagement count in memory;
switching the clutch pack to the compressed state by applying pressure to the first apply plate when the clutch engagement count is an odd number; and
switching the clutch pack to the compressed state by applying pressure to the second apply plate when the clutch engagement count is an even number.

29. The method as set forth in claim 27 wherein said step of switching the clutch pack to the compressed state at the first time includes controlling a first actuator to apply pressure to the first apply plate and wherein said step of switching the clutch pack back to the compressed state at the third time includes controlling a second actuator to apply pressure to the second apply plate.

30. The method as set forth in claim 29 wherein the first and second actuators are hydraulically actuated and are controlled by sequentially switching fluid flow to the first actuator and the second actuator.

31. The method as set forth in claim 27 wherein said steps of compressing the plurality of friction plates and reaction plates between the first apply plate and the second apply plate at the first and third times causes the clutch housing to rotate at the same speed as the shaft.

32. The method as set forth in claim 27 wherein the clutch housing is rotationally fixed and wherein said steps of compressing the plurality of friction and reaction plates between the first apply plate and the second apply plate at the first and third times slows rotation of the shaft.

33. The method as set forth in claim 27 wherein the second time is subsequent to the first time and the third time is subsequent to the second time.

34. The method as set forth in claim 27 wherein said step of switching the clutch pack to the compressed state at the first time includes applying pressure to both the first apply plate and the second apply plate to move the first apply plate and the second apply plate longitudinally toward one another.

35. The method as set forth in claim 27 wherein pressure is not applied to the second apply plate during said step of switching the clutch pack to the compressed state at the first time.

36. The method as set forth in claim 27 wherein pressure is not applied to the first apply plate during said step of switching the clutch pack back to the compressed state at the third time.

* * * * *